United States Patent
Rubbiani et al.

(10) Patent No.: US 11,200,469 B2
(45) Date of Patent: Dec. 14, 2021

(54) GRAPHIC ADAPTATION METHOD AND SYSTEM FOR CERAMIC SUPPORTS, SPECIFICALLY TILES

(71) Applicant: SYSTEM CERAMICS S.P.A., Fiorano Modenese (IT)

(72) Inventors: Matteo Rubbiani, Formigine (IT); Davide Bonvicini, Castelfranco Emilia (IT); Franco Stefani, Sassuolo (IT)

(73) Assignee: SYSTEM CERAMICS S.P.A., Modena (IT)

( * ) Notice: Subject to any disclaimer, the term of this patent is extended or adjusted under 35 U.S.C. 154(b) by 0 days.

(21) Appl. No.: 16/766,108

(22) PCT Filed: Nov. 22, 2018

(86) PCT No.: PCT/IB2018/059219
§ 371 (c)(1),
(2) Date: May 21, 2020

(87) PCT Pub. No.: WO2019/102391
PCT Pub. Date: May 31, 2019

(65) Prior Publication Data
US 2020/0349403 A1 Nov. 5, 2020

(30) Foreign Application Priority Data
Nov. 23, 2017 (IT) .................. 102017000134322

(51) Int. Cl.
*B41M 1/34* (2006.01)
*G06K 15/02* (2006.01)
(Continued)

(52) U.S. Cl.
CPC ............. *G06K 15/027* (2013.01); *B41M 1/34* (2013.01); *G06K 15/024* (2013.01);
(Continued)

(58) Field of Classification Search
CPC ............... G06K 15/027; G06K 15/024; G06K 2009/487; G06K 2009/6213;
(Continued)

(56) References Cited

U.S. PATENT DOCUMENTS 9,704,236 B2    7/2017   Kogan et al.
2003/0208345 A1*  11/2003  O'Neill ..................... G01J 3/46
                                                                703/6
(Continued)

FOREIGN PATENT DOCUMENTS

CN          203 061 453 U        7/2013

OTHER PUBLICATIONS

Lopez, F., et al. "A Study of Registration Methods for Ceramic Tile Inspection Purposes." Jan. 1, 1999, ISBN: 978-0-8478-2227-0 Retrieved from the Internet: https://www.researchgate.net/publication/240626869_A_Study_of_Registration_Methods_for_Ceramic_Tile_Inspection_Purposes [retrieved May 21, 2020]. 6 pages.
(Continued)

*Primary Examiner* — Jamares Q Washington
(74) *Attorney, Agent, or Firm* — Steinfl + Bruno LLP

(57) ABSTRACT

A graphics adaptation method for printable ceramic supports. Images are printed on sample ceramic supports starting from an original image file. A sample printed image is acquired. Sample points representative of the sample image are selected. Original points present in the original image file are also selected. A point-based matching is sought between the sample points and the original points, on the basis of which the original image file is modified and an adapted image file is determined, thus adapting the graphics of the original image file to the graphics of the sample image. A graphics adaptation system based on the method is also described.

18 Claims, 8 Drawing Sheets

(51) Int. Cl.
  *B41M 5/26* (2006.01)
  *B41M 5/00* (2006.01)
(52) U.S. Cl.
  CPC ......... *G06K 15/1878* (2013.01); *B41M 5/007* (2013.01); *B41M 5/262* (2013.01)
(58) Field of Classification Search
  CPC . G06K 9/6211; G06K 9/00416; B41M 5/007; B41M 5/262; B41M 1/34
  USPC ....... 358/1.9, 3.24, 3.29, 3.31, 1.6; 382/141, 382/112
  See application file for complete search history.

(56) References Cited

U.S. PATENT DOCUMENTS

| | | |
|---|---|---|
| 2013/0148912 A1 | 6/2013 | Chong |
| 2014/0192373 A1* | 7/2014 | Maccari ............... H04N 1/4078 358/1.9 |

OTHER PUBLICATIONS

International Search Report for International Application No. PCT/IB2018/059219 filed Nov. 22, 2018 on behalf of SYSTEM S.p.A. dated Feb. 20, 2019. 5 pages.
Written Opinion for International Application No. PCT/IB2018/059219 filed Nov. 22, 2018 on behalf of SYSTEM S.p.A. dated Feb. 20, 2019. 8 pages.

* cited by examiner

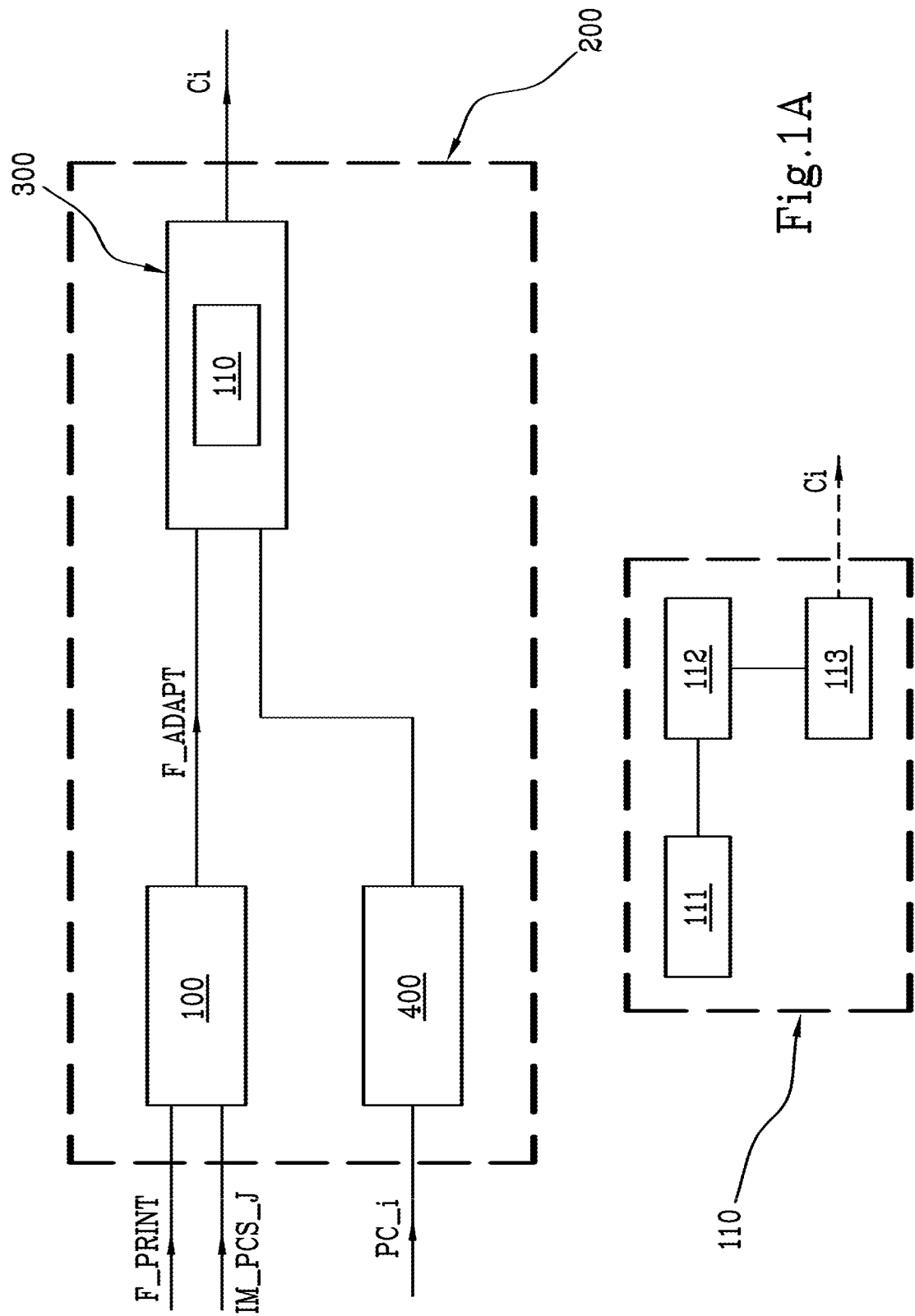

ORIGINAL GRAPHIC FILE (I_PRINT) (GRAF_1)  (f0)

SAMPLE IMAGES (IM_PCS_J)  (f2)

GRAPHIC ADAPTATION METHOD AND SYSTEM FOR CERAMIC SUPPORTS, SPECIFICALLY TILES

CROSS REFERENCE TO RELATED APPLICATIONS

The present application is the U.S. national stage of International Patent Application PCT/IB2018/059219 filed internationally on Nov. 22, 2018, which, in turn, claims priority to Italian Patent Application No. 102017000134322 filed on Nov. 23, 2017.

FIELD OF APPLICATION

The present invention relates to a graphic adaptation method and system for ceramic supports, specifically tiles.

More in particular, the present invention relates to a graphic adaptation method and system for ceramic supports, specifically tiles, adapted to receive a print performed starting from an original graphic file.

PRIOR ART

In recent years, the production of ceramics has undergone a revolution in relation to printing technologies. From the traditional method that characterised ceramic decoration until the end of the last century, i.e. rotary printing through silicone cylinders, methods have moved on to a contact-less print based on inkjet printers where an appropriate graphic file, processed and split into one-colour channels, is used as the source for printing on tiles of various sizes through printers provided with printheads arranged along transverse bars.

In general there are two different printing modes:
fixed face printing: a graphic studio prepares a discrete, even high, number of fixed faces which are printed according to a predetermined sequence onto ceramic supports;
random printing starting from a larger graphic of the format. An algorithm randomly calculates a printing area as large as the format of tiles to be printed, which is cut out and printed onto the ceramic support at the time of printing itself, without previous preparation (real time). In this case the number of faces is extremely high.

In both printing modes, the ceramic product obtained can be inspected straight after decoration, at the outlet of the digital printer, or after firing, when it is ready to be boxed.

In general, to be able to successfully inspect the ceramic product, it is necessary to have a comparison model.

If the printing takes place with fixed faces, it is necessary to memorise all the faces by acquiring prints free from defects through a television camera and save them in an archive, in a step called the "learning" step.

At the end of the learning step, each tile of the production, acquired in the same way, can be compared with the images stored in the learning step and then, once the homologous model has been identified and through image processing algorithms, any differences are highlighted, i.e. potential production defects.

Therefore, in fixed face printing, provided with a tile image, it is necessary to identify among all the possible sample images, the one that looks most like it, to be used as a reference image for printing (template).

If the print is casual (random) there is potentially an extremely high number of comparison faces, hence it is impossible to acquire all the comparison faces through television camera.

Therefore, it is impossible to have an effective comparison sample deduced from the direct acquisition of material.

Thus, samples must be obtained by deducing them from the original graphic file that represents the printing source.

In the event of random printing, the acquisition of the sample images determines a multitude of problems, among which one of the most significant ones is a different colour rendering between the source graphic file and the acquired image with probable lack of colour conformity of the final ceramic product to the source graphic file.

It is known that "colour rendering" means the colour assumed by each point of the image, expressed in a known colorimetric system such as, for example, RGB, HSL etc.

Further problems encountered are:
possibility that the print resolution on ceramic products is different with respect to the acquisition resolution of the television camera;
possible perspective deformations induced by the acquisition of the television camera;
possible effects of imperfect equalisation of the image, due to the geometry of the acquisition system in combination with the geometry of the lighting system;
possible rotations of the piece with respect to the graphics, due to incorrect alignment between the tile and the printer;
possible imperfect matching in terms of points between graphic and product (due to the interaction between inks and ceramic support, e.g. blurring effects due to the spreading and absorption of drops).

In general, there is a problem of probable inconsistency between the identifying graphic characteristics of the original graphic file and those of the images acquired from the sample ceramic supports.

It follows that the use of the original graphic file (without processing) used for printing to evaluate the correctness thereof a priori (quality control) is impossible.

In solutions of the prior art, furthermore, any defects caused by digital printing, such as dark bands, stripes and the like can only be discovered on the ceramic products, i.e. only after firing and at the outlet from the kiln.

It can be understood how a defective print implies a concrete risk of rejection/declassification of products already fired and ready to be boxed.

The object of the present invention is to provide a method and/or a graphic adaptation system for ceramic supports adapted to receive a print that overcomes the drawbacks of the prior art.

Another object of the present invention is to guarantee a match of the colour range between the original graphic file and the acquired ceramic support.

The object of the present invention is further to provide a method and/or a quality control system for ceramic supports adapted to receive a print that overcomes the drawbacks of the prior art.

SUMMARY OF THE INVENTION

In a first aspect, the present invention describes a graphic adaptation method for sample ceramic supports adapted to receive a print, wherein the method comprises the steps of:
loading an original image file representative of an image for printing comprising a graphic to be printed on a plurality of ceramic supports, wherein said original image file is graphically defined in terms of first identifying graphic characteristics comprising an original value of colour rendering;

printing a plurality of images on said sample ceramic supports starting from said original image file;

acquiring a sample image of said plurality of images printed on sample ceramic supports, wherein said sample image is graphically defined in terms of second identifying graphic characteristics comprising a sample value of colour rendering;

selecting sample points representative of said sample image, and selecting original points present in the original image file, matching in terms of points between said sample points representative of said sample image, and original points present in said original image file;

modifying said original image file starting from said match in terms of points determining an adapted image file, thus adapting the graphic of the original image file to the graphic of the sample image.

Preferably, the step of matching in terms of points comprises seeking a biunique match between sample points, representative of the sample image, and the original points present in the original image file.

Preferably, the step of matching in terms of points envisages seeking a biunique spatial and colour match in terms of points, between sample points, representative of the sample image, and the original points present in the original image file.

Preferably the method comprises the step of:
   extracting at least one original image in said original image file corresponding to said sample image as a function of said match in terms of points sought.

Preferably the method comprises the step of:
   graphically aligning said sample image and said at least one original image, as a function of one or more from among the respective resolutions and the respective perspectives.

Preferably the method comprises the step of:
   calculating, in reference to said sample image and to said at least one original image aligned and at the same resolution, transformation values between said sample value of colour rendering and said original value of colour rendering starting from said match in terms of points between said sample points and said original points, thus adapting the graphic of the original image file to the graphic of the sample image in terms of colour rendering.

Preferably, said step of calculating transformation values comprises the steps of:
   identifying a first sliding window in said original image and a second sliding window in said sample image in which said sliding windows slide in the respective images in a like way;

calculating sample representative values of a sample colour space of said sample image and original representative values of an original colour space of said original image, respectively in each of said second sliding window and said first sliding window;

mapping said sample representative values and said original representative values enabling a transformation from said original value of colour rendering to said sample value of colour rendering.

Preferably, said step of calculating transformation values further comprises the steps of:
   identifying a colour transformation between said sample representative values and said original representative values which is representative of a complete mapping between said sample colour space and said original colour space.

Preferably, said complete mapping is obtained through one of the following:
   linear regression technique in which a matrix of coefficients is calculated which is the solution of a system of linear equations formed by samples obtained in the mapping step from said sample representative values to said original representative values.

an Artificial Neural Network technique, wherein the matches between the original colour space and the sample colour space obtained in the preceding mapping step from said sample representative values and said original representative values are used for training an artificial neural network.

Preferably, said sample representative values are values of one or more RGB triplets.

Preferably, said complete mapping is obtained via a Look Up Table in which each triplet of the original colour space is associated with one from among mean, mode, median of the samples mapped by the sample colour space, obtained in the preceding step of mapping from said sample representative values to said original representative values.

Preferably, said complete mapping further comprises the steps of:
   verifying the mapping of the Look Up Table; if the Look Up Table does not completely map the RGB triplets of the original colour space:
   acquiring further sample images for mapping a part of the original colour space not yet mapped;
   estimating the missing RGB triplets using the 1:1 matches of the Look Up Table as parameters for the linear regression system or alternatively for training an artificial neural network.

Preferably, said modifying step f5 of said original image file includes modifying the original image file as a function of said calculated colour transformation, determining said adapted image file.

Preferably, said step of graphically aligning is realised by variation of an original resolution of said original image to the value of a sample resolution of said sample image.

Preferably, said step of printing a plurality of images on sample ceramic supports is realised in a printing mode between random mode and fixed faces mode.

Preferably, said step of printing a plurality of images on ceramic supports comprises:
   printing, in random mode, a limited plurality of images on said sample ceramic supports starting from said original image file;
and said acquiring step comprises:
   randomly acquiring said sample image of said plurality of sample ceramic supports printed in random mode.

Preferably, said step of matching in terms of points by printing in random mode is realised for seeking the position in which the sample image is positioned in the original image file.

Preferably, said printing step comprises:
   printing, in fixed faces mode, a limited plurality of images on said sample ceramic supports starting from said original image file;
and said acquiring step comprises:
   acquiring said one sample image of said plurality of images printed on said printed sample ceramic supports in fixed faces mode.

In a second aspect, the invention discloses a quality control method for ceramic supports comprising the steps of:

generating a suitable image file starting from an original image file as described in the first aspect of the invention;

receiving a printed ceramic support;

identifying a portion in said adapted image file, corresponding to the graphic reproduced on said printed ceramic support;

detecting graphic differences between the graphic reproduced on said printed ceramic support and said portion of the adapted image file;

classifying into classes said printed ceramic support as a function of said detected differences, thus realising a quality control of said printed ceramic supports.

In a third aspect of the invention, the method of the first aspect of the invention is a computer implemented method.

In a fourth aspect of the invention, the method of the aspect of the invention is a computer implemented method.

In a fifth aspect, the present invention describes a graphic adaptation system for sample ceramic supports adapted to receive a print, wherein the system comprises:

a printer configured for printing a limited plurality of images on said sample ceramic supports starting from an original image file graphically defined in terms of first identifying graphic characteristics comprising an original value of colour rendering;

an image acquisition device configured to acquire a sample image of said plurality of images printed on said sample ceramic supports, wherein said sample image is graphically defined in terms of second identifying graphic characteristics depending on the image acquiring device and comprising a sample value of colour rendering;

a first processing station comprising:

a loading module configured to load said original image file representative of an image for printing comprising a graphic to be printed on said plurality of said ceramic supports;

a first selection module configured for selecting sample points representative of said sample image, and selecting original points present in the original image file, a comparing module configured for matching in terms of points between said sample points and original points present in the original image file;

an adapting module configured for modifying said original image file starting from said match in terms of points determining an adapted image file, thus adapting the graphic of the original image file to the graphic of the sample image.

Preferably, said comparing module is configured for matching in terms of points between said sample points and said original points present in said original image file through seeking a biunique match between said sample points, representative of the sample image, and said original points present in the original image file.

Preferably, said comparing module is configured for seeking said match in terms of points between a search for a spatial and colour match, between sample points, representative of the sample image, and the original points present in the original image file.

Preferably, said first processing station comprises an extraction module configured for extracting at least one original image in said original image file corresponding to said sample image as a function of said match in terms of points detected.

Preferably, said first processing station comprises a graphic alignment module configured for graphically aligning said sample image and said at least one original image, as a function of one or more from among the respective resolutions and the respective perspectives.

Preferably, said first processing station comprises a calculating module configured for calculating, in reference to said sample image and to said at least one original image aligned and at the same resolution, transformation values between said sample value of colour rendering and said original value of colour rendering starting from said match in terms of points between said sample points and said original points, adapting the graphic of the original image file to the graphic of the printed ceramic support in terms of colour rendering.

Preferably, said processing station further comprises:

a first identifying module configured for identifying a first sliding window in said original image and a second sliding window in said sample image in which said sliding windows slide in the respective images in a like way;

a second calculating module configured for calculating sample representative values of a sample colour space of said sample image and original representative values of an original colour space of said original image, respectively in each of said second sliding window and said first sliding window;

a mapping module configured for mapping said sample representative values and said original representative values enabling a transformation from said original value of colour rendering to said sample value of colour rendering.

Preferably, said processing station further comprises:

a second identifying module configured for identifying a colour transformation between said sample representative values and said original representative values which is representative of a complete mapping between said sample colour space and said original colour space.

Preferably, said second identification module comprises one or more from among:

a first transformation sub-module configured to identify the colour transformation by means of a linear regression technique;

a second transformation sub-module configured to identify the colour transformation by means of an Artificial Neural Network technique.

Preferably, said second identification module comprises:

a third transformation sub-module configured to identify the colour transformation by means of a technique exploiting a Look Up Table, wherein said second identifying module is configured to:

verify the mapping of the Look Up Table;

if the Look Up Table does not completely map the triplets of the original colour space:

acquire further sample images for mapping a part of the original colour space not yet mapped;

estimate the missing RGB triplets using the 1:1 matches of the Look Up table as parameters for the linear regression system or alternatively for training an artificial neural network.

Preferably, said printer is configured for printing in either the random or fixed faces modes.

In a sixth aspect, the present invention discloses a quality control system for ceramic supports comprising:

a graphic adaptation system according to what is described in the fifth aspect, configured to generate an adapted image file starting from an original image file;

a receiving means for receiving a printed ceramic support;

a classification system, coupled to said graphic adaptation system and to said receiving means for receiving a printed ceramic support, comprising a second processing station comprising:

a research module configured to identify a portion in said adapted image file, corresponding to the graphic reproduced on said printed ceramic support;

a detecting module configured to identify graphic differences between the graphic reproduced on said printed ceramic support and said portion of said adapted image file;

a classification module configured to classify into classes said printed ceramic support as a function of said detected differences, thus realising a quality control of said printed ceramic supports.

In a seventh aspect, the present invention describes a production system for producing ceramic supports comprising a quality control system for ceramic supports, according to the sixth aspect, interposed between an image printing system on ceramic supports and a kiln for firing said ceramic supports.

In an eighth aspect, the present invention describes a program for a calculator configured, in use, for performing the method of the first aspect of the invention.

In a ninth aspect, the present invention describes a program for a calculator configured, in use, for performing the method of the second aspect of the invention.

The invention achieves the main technical effect of guaranteeing a match of the colour range between the original graphic file and the printed ceramic support.

The technical effect achieved is an efficient extraction of possible production defects, reducing false recognitions.

The technical effects mentioned, advantages cited and other technical effects/advantages of the invention will emerge in further detail from the description provided herein below of an example of embodiment provided by way of approximate and non-limiting example with reference to the attached drawings.

BRIEF DESCRIPTION OF THE DRAWINGS

FIG. 1a shows, in a schematic view, a quality control system comprising the graphic adaptation system of FIG. 1.

DETAILED DESCRIPTION

A graphic adaptation system 100 for sample ceramic supports according to the invention comprises, in general, a printer configured for printing a limited plurality of sample ceramic supports starting from an original image file, a colour or b/w image acquiring device configured to acquire a sample image for each sample ceramic product, and a processing station configured for graphically adapting the original image file to the acquired image in terms of colour rendering, resolution and perspective.

Figure 1:
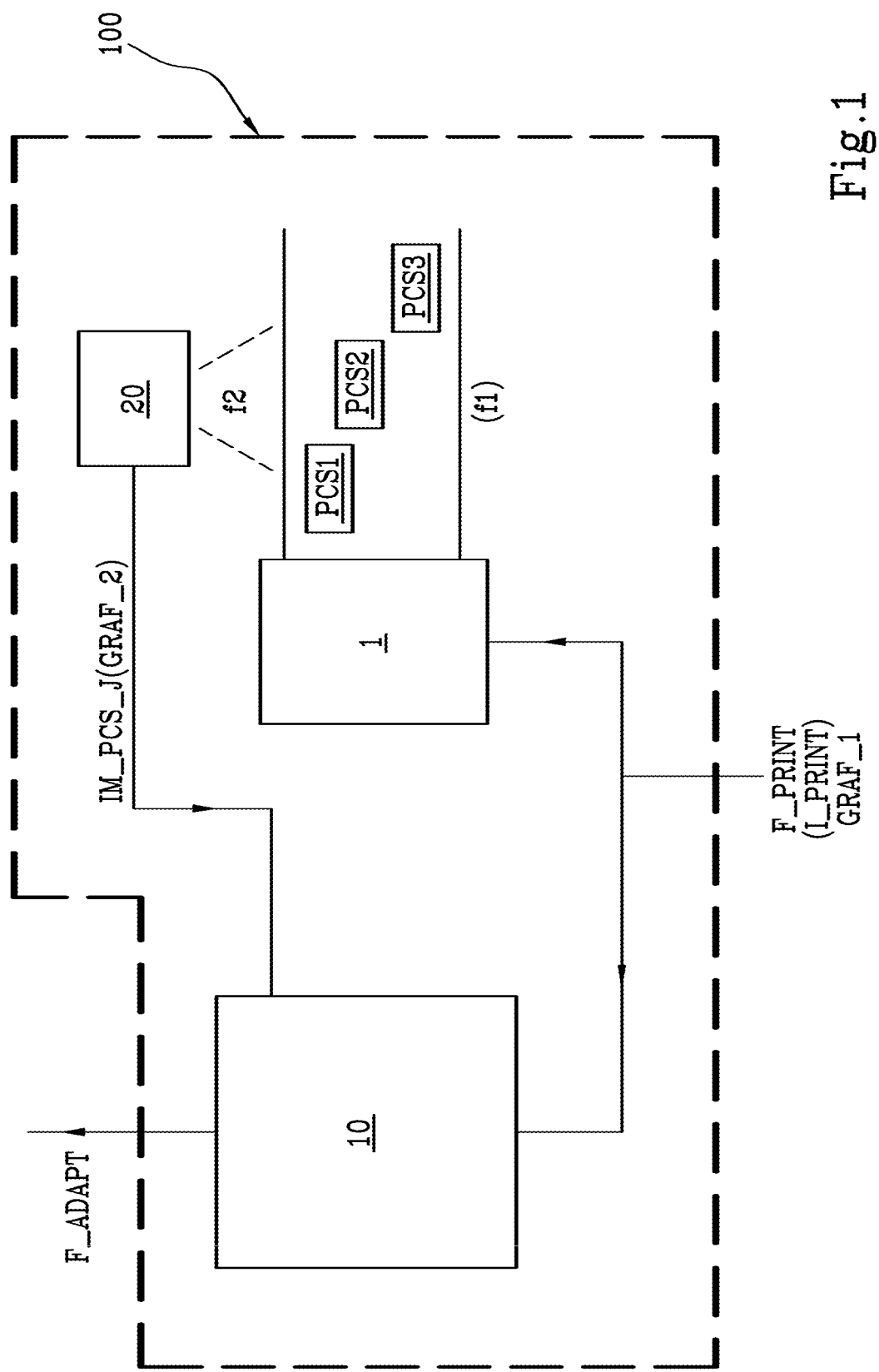
FIG. 1 shows, in a schematic view, the graphic adaptation system of the invention.
Figure 2:
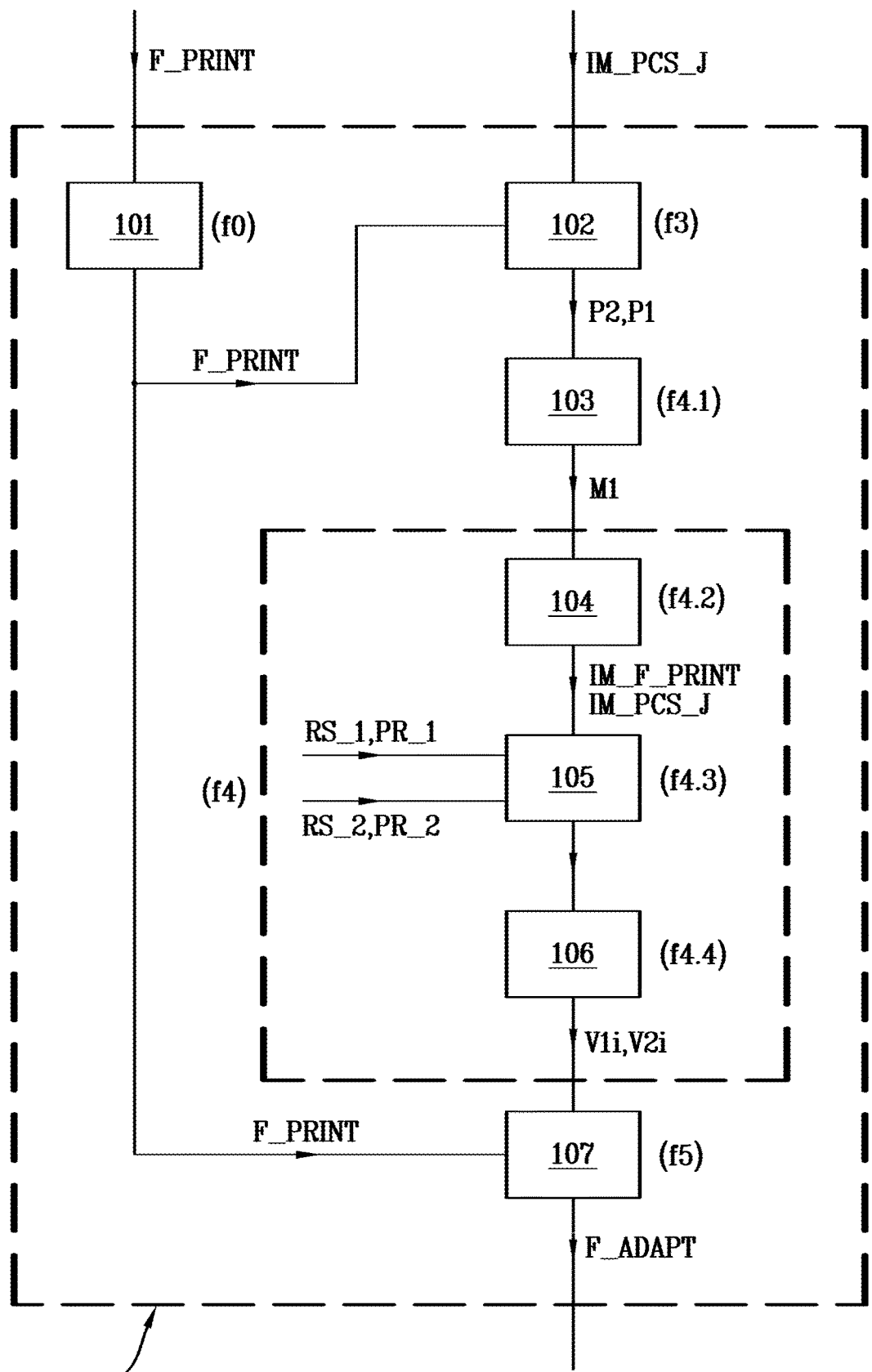
FIG. 2 shows, in a schematic view, a first group of functional and/or memory modules comprised in a processing station according to the invention.

With reference to FIGS. 1 and 2, a first processing station 10 is shown.

In general, it should be noted that in the present context and in the claims herein below, the first processing station 10 is presented as being subdivided into distinct functional modules (memory modules or operating modules) for the sole purpose of describing the functions thereof clearly and thoroughly.

Such first processing station 10 can comprise a single electronic device, appropriately programmed to perform the functionalities described, and the different modules can correspond to hardware entities and/or routine software that are part of the programmed device.

Alternatively, or in addition, these functions can be performed by a plurality of electronic devices over which the aforesaid functional modules can be distributed.

The first processing station 10 can also make use of one or more processors for execution of the instructions contained in the memory modules.

Said functional modules can also be distributed over different local or remote computers, depending on the architecture of the network in which they reside.

In particular, in FIG. 2, the first processing station 10 comprises a loading module 101 configured to perform a loading step f0 (FIG. 2) of an original image file F_PRINT. The file loading step envisages loading an original image file F_PRINT representative of an image for printing I_PRINT (FIG. 1) comprising a graphic to be printed onto a plurality of ceramic supports PC_i.

In other words, the first processing station 10 is configured for loading an original image file F_PRINT representative of an image for printing I_PRINT (FIG. 1) comprising a graphic to be printed on a plurality of ceramic supports PC_i.

In one embodiment of the invention, specific for fixed face printing, a combination of parts of the graphic coincides with the image for printing I_PRINT.

In another embodiment of the invention, specifically for random printing, the parts of the graphic represent random samples of the image for printing I_PRINT.

The original image file F_PRINT is graphically defined in terms of first identifying graphic characteristics GRAF_1.

Preferably, the first identifying graphic characteristics GRAF_1 comprise one or more from among:
an original value of colour rendering RC_1;
a resolution RS_1;
a reference perspective PR_1.

With reference to FIG. 1, a printer 1 is shown, configured for printing on ceramic supports.

In particular the printing can take place in random or fixed faces mode.

The invention envisages a printing step f1 (FIG. 1) of a limited plurality of sample ceramic supports PCS_j starting from the original image file F_PRINT.

According to the prior art of the field of printing on ceramic supports, the printing of the plurality of sample ceramic supports PCS_i is performed in one mode from among the random mode and the fixed faces mode.

It can be understood that step f1 is a production step for producing a limited plurality of sample ceramic supports PCS_j bearing a print bearing the image for printing I_PRINT contained in the original image file F_PRINT.

The terminology "printing on ceramic supports" in technical jargon has the meaning specified in the previous paragraph, and during the description reference will be made to this interpretation unless otherwise indicated.

With reference to the prior art described (pag.2) it is clear that a plurality of ceramic supports is produced in a production line and that, following this, an image is printed onto the plurality of ceramic supports.

Figure 3:
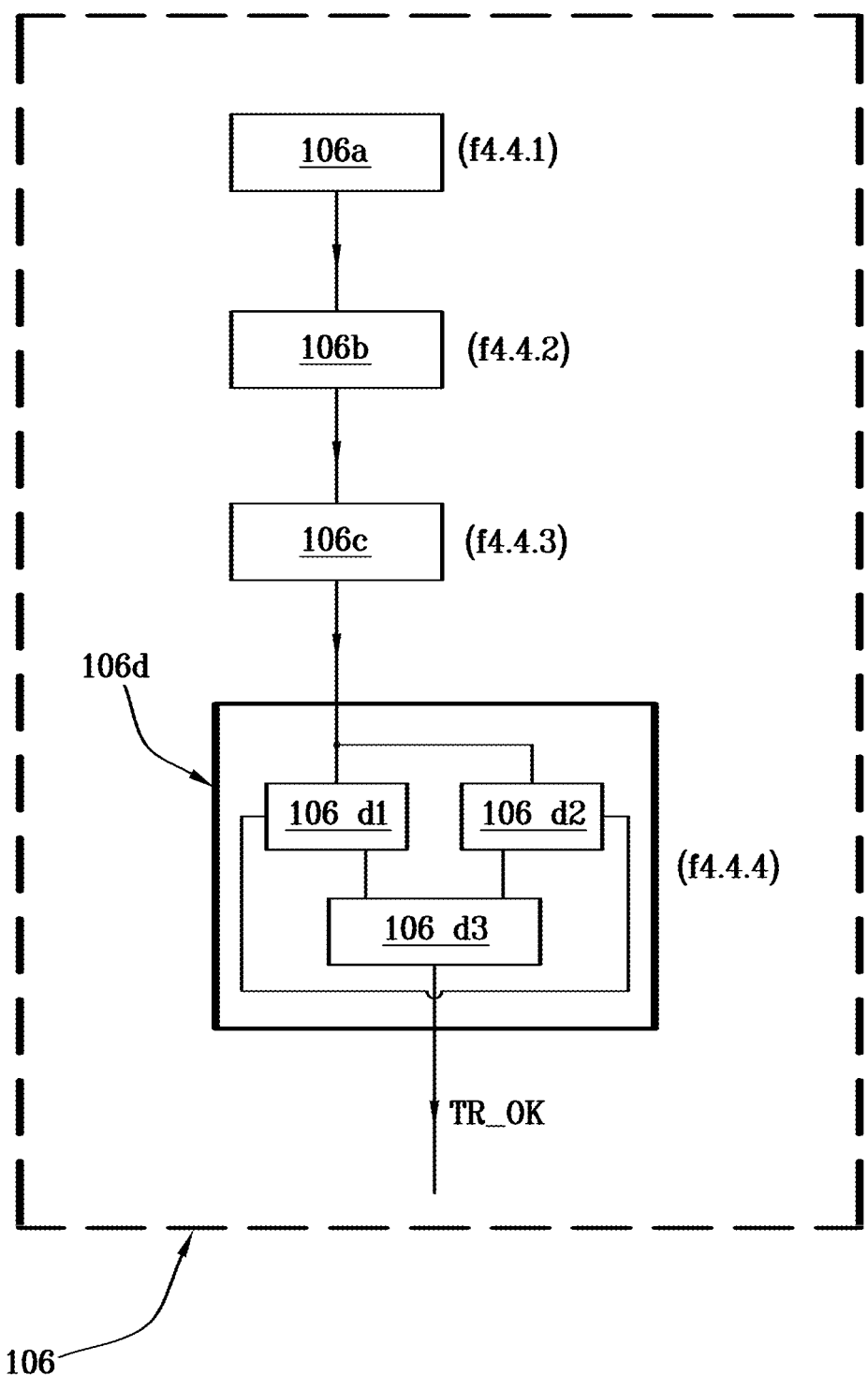
FIG. 3 shows, in a schematic view, a second group of functional and/or memory modules comprised in the processing station according to the invention.
Figure 4:
FIG. 4 shows a graphic comparison between acquired images and an original image file according to the invention.
Figure 4:

With reference to FIG. 1, an image acquisition device 20 is further shown, configured to (f2) acquire a sample image IM_PCS_j (FIG. 3) of the plurality of sample ceramic supports PCS_j printed by the printer 1.

In one embodiment related to the random printing mode, the image acquiring device 20 is configured to acquire a sample image IM_PCS_j (FIG. 3) of the limited plurality of sample ceramic supports PCS_j printed in random mode by the printer 1.

In particular, the image acquiring device 20 comprises one or more colour or b/w television cameras, respectively provided for acquiring colour or b/w images.

The sample image IM_PCS_j is graphically defined in terms of second identifying graphic characteristics GRAF_2 depending on the filming device 20.

The second identifying graphic characteristics GRAF_2 comprise one or more from among:
 a sample value of colour rendering RC_2;
 a sample resolution RS_2;
 a second reference perspective PR_2.

It is to be understood that the first identifying graphic characteristics GRAF_1 are different from the second identifying graphic characteristics GRAF_2, at least in terms of the colour rendering, the former being related to the original image file, the second depending on an "alteration" induced by the image acquiring device 20.

The invention further envisages identifying, within each sample ceramic support image acquired IM_PCS_j, a series of characteristics that characterise the graphic reproduced on the ceramic support.

Figure 5:
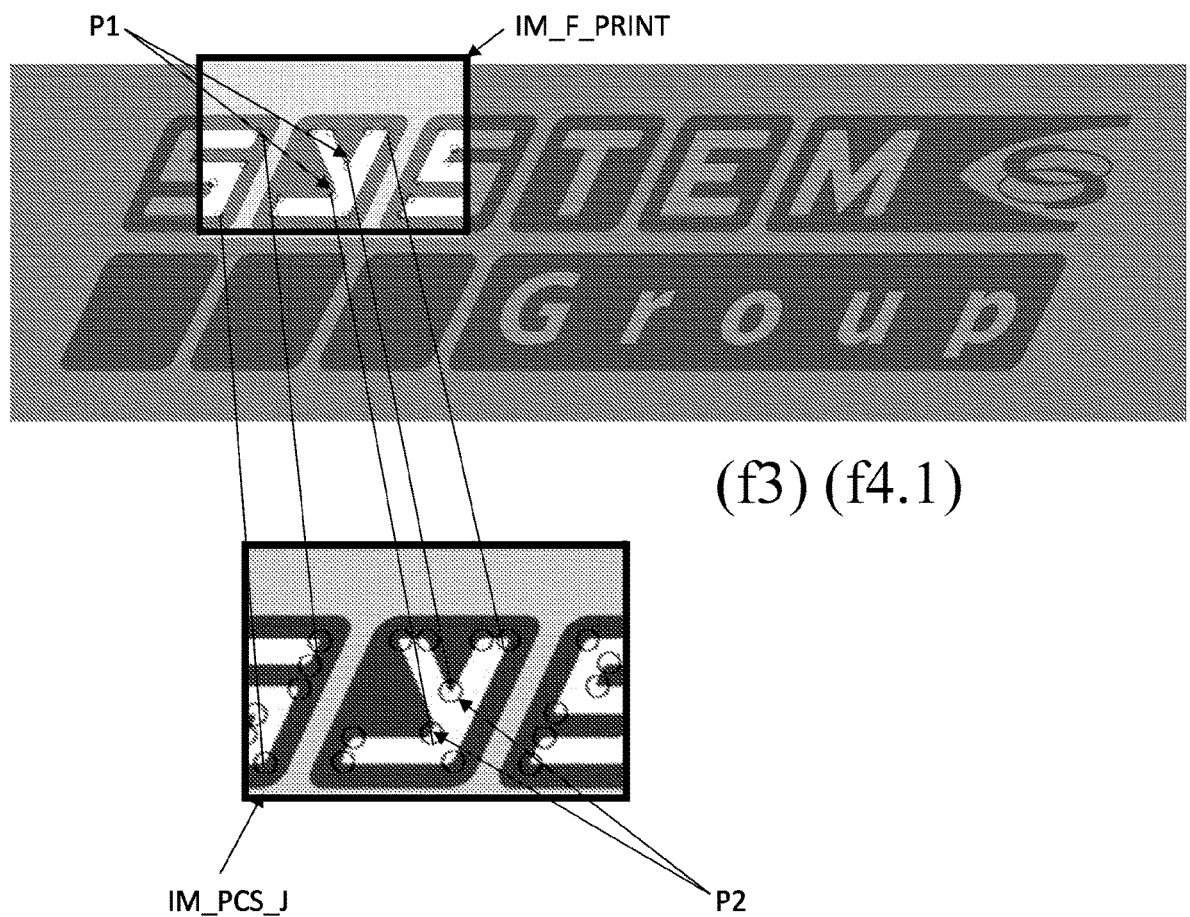
FIG. 5 shows a selection of points representative of an acquired image and an image in the original file starting from representative points, according to the invention.

According to the invention, with reference to FIGS. 2 and 5, a step f3 is therefore envisaged for the selection of sample points (key points) P2 of an acquired ceramic support in which the points are representative of the sample image IM_PCS_j.

Each of the sample points P2 is characterised by a describer D2 comprising a plurality of characteristic elements, representative of local graphic characteristics of each point, defined as "local features".

It is required that there be sufficiently numerous sample points selected so as to be able to describe the sample image well.

The first processing station 10 comprises a first selection module 102 (FIG. 2) configured to perform the described step.

According to the invention, with reference to FIGS. 2 and 5, the point selection step f3 is further configured for the selection of original points P1 present in the original image file F_PRINT.

Each of the original points P1 is characterised by a describer D1 comprising a plurality of characteristic elements, representative of local characteristics of each point, defined as "local features".

It is required that there be sufficiently numerous original points P1 selected so as to be able to describe the sample image well.

The first selection module 102 (FIG. 2) is configured to also perform this selection step of original points P1.

According to the invention, a match seeking step f4.1 is also provided.

In other words, the first processing station 10 is configured to select the sample points (key points) P2 of an acquired ceramic support in which the points are representative of the sample image IM_PCS_j, and for selecting the original points P1 present in the original image file F_PRINT.

With reference to FIGS. 2 and 5, the step f4.1 comprises matching in terms of points M1 between the sample points P2 representative of the sample image IM_PCS_j, and original points P1 present in the original image file F_PRINT.

In other words, the step f4.1 comprises seeking a biunique match between the sample points P2, representative of the sample image IM_PCS_j, and the original points P1 present in the original image file F_PRINT.

In particular, the match M1 is a spatial and colour match in terms of points, between the sample points P2, representative of the sample image IM_PCS_j, and original points P1 present in the original image file F_PRINT.

In particular, for printing in random mode, the matching is performed in order to find the position in which the sample ceramic support PCS_j, is positioned in the original image file F_PRINT.

The first processing station 10 comprises a comparing module 103 (FIG. 2) configured to perform the described step.

According to the invention, at this point the original image file F_PRINT is modified so that it matches the sample image in terms of points.

Precisely, the invention comprises a modification step f5 of modifying the original image file F_PRINT starting from the match in terms of points M1 determining an adapted image file F_ADAPT, thus adapting the graphic of the original image file F_PRINT to the graphic of the sample image IM_PCS_j.

An adapting module 107 in the first processing station 10 is configured to perform the described step f5.

According to the invention, the step f5 of modifying the original image file F_PRINT envisages, subsequently to the step f4.1 of matching in terms of points, a step f4.2 of image extraction for identifying in the original image F_PRINT a region of interest ROI that matches the sample image IM_PCS_j printed on the ceramic support.

In other words, the first processing station 10 is configured for matching in terms of points M1 between the sample points P2 and original points P1 present in the original image file F_PRINT.

Figure 6A:
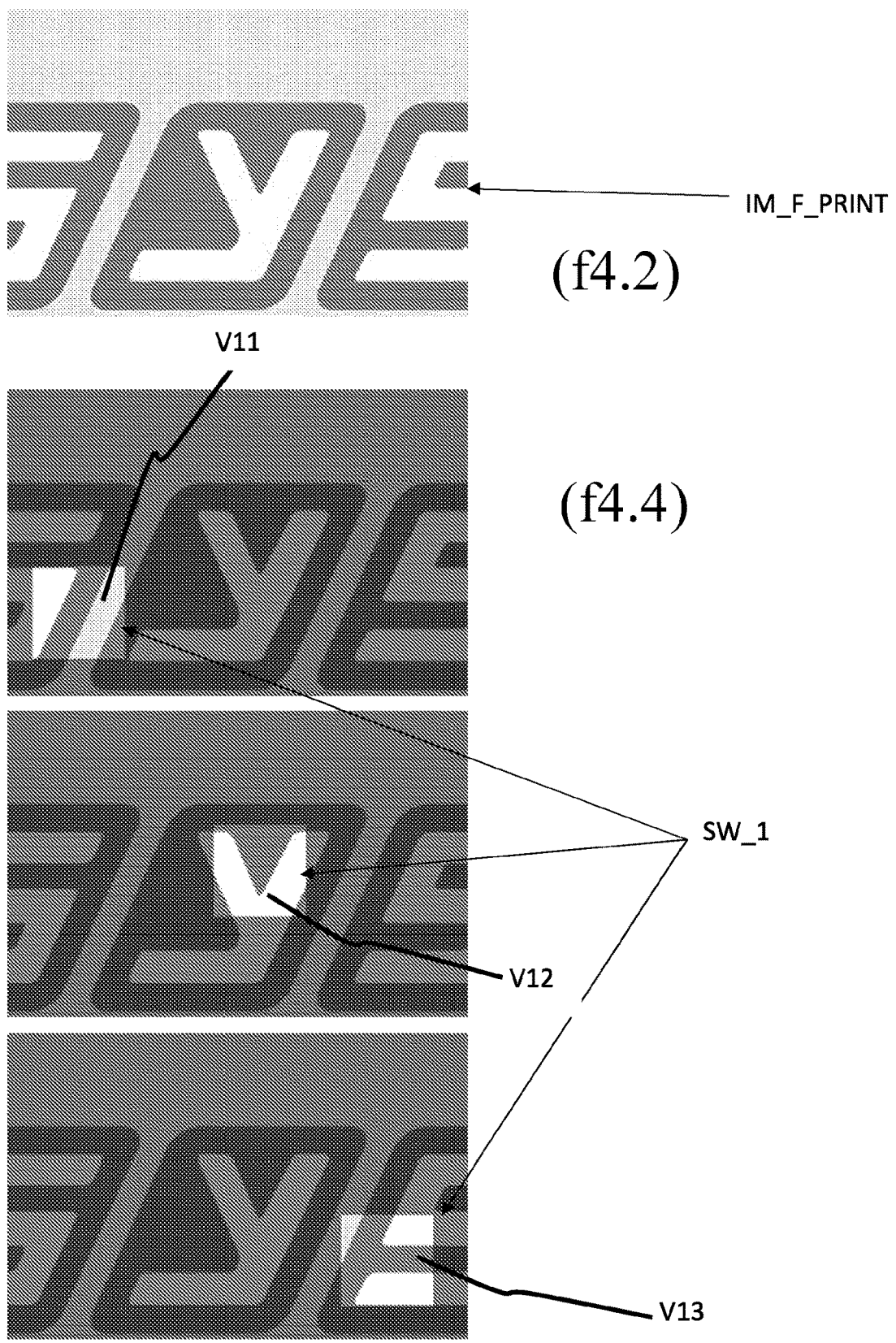
FIG. 6A shows sliding windows in the original file.
Figure 6B:
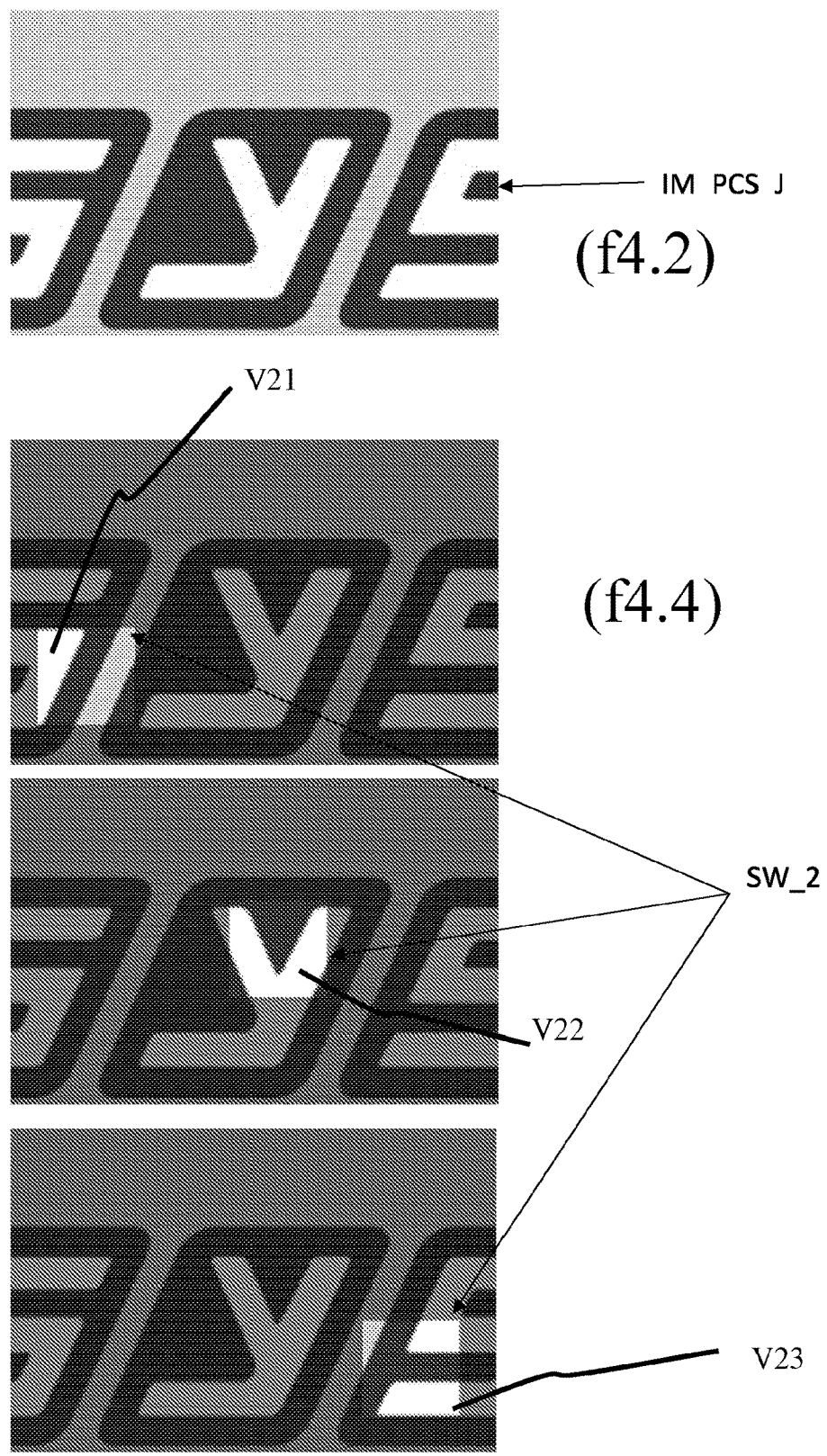
FIG. 6B shows sliding windows in the acquired file.

With reference to FIGS. 2 and 6A, 6B the step f4.2 envisages extracting at least one original image IM_F_PRINT in the original image file F_PRINT corresponding to the sample image IM_PCS_j as a function of the match in terms of points M1 detected. The first processing station 10 comprises an extraction module 104 (FIG. 2) configured to perform the described step.

The two images however maintain different identifying graphic characteristics GRAF_1, GRAF_2, in particular different resolution, colour rendering and perspective.

In other words, the first processing station 10 is configured for extracting at least one original image IM_F_PRINT from the original image file F_PRINT that corresponds to the sample image IM_PCS_j as a function of the match in terms of points M1 detected.

According to the invention, a further step f4.3 of graphic realignment is also comprised.

With reference to FIG. 2 the step f4.3 envisages graphically aligning the sample image IM_PCS_j and the at least one original image IM_F_PRINT, so that they are perfectly aligned.

The first processing station 10 comprises a graphic realignment module 105 (FIG. 2) configured to perform the described step.

In other words, the first processing station 10 is configured for graphically aligning the sample image IM_PCS_j and the at least one original image IM_F_PRINT, so that they are perfectly aligned, as a function of the respective resolutions RS_2, RS_1 and/or the respective perspectives PR_2, PR_1.

According to the invention, the graphic alignment is realised by exploiting the spatial relationship between the coordinates of the sample points P2 in the sample image IM_PCS_j and the coordinates of the original points P1 in the original image IM_F_PRINT.

In other words, the spatial relationship between the coordinates of the sample points P2 and of the original points P1 allows to identify the perspective transformation or the affine transformation (in matrix form) that allows the original image IM_F_PRINT to be aligned with the desired graphic portion of the sample image IM_PCS_j as a function of the respective resolutions RS_1, RS_2 and/or the respective perspectives PR_1, PR_2. In particular, the resolution is defined as a function of the resolutions RS_1, RS_2 and preferably of the quality control algorithms used.

According to the invention, a step f4.4 is also comprised, of conversion of the colour space for adapting the value of colour rendering RC_1 of the original file to the value of colour rendering RC_2 of the sample.

With reference to FIG. 2, the step f4.4 comprises calculating, with reference to the sample image IM_PCS_j and to the at least one original image IM_F_PRINT aligned and at the same resolution, the values of transformation V1$i$→V2$i$ from the original value of colour rendering RC_1 to the sample value of colour rendering RC_2 starting from the match in terms of points M1 between the sample points P2 and the original points P1.

The technical effect achieved is an adaptation of the graphic of the original image file F_PRINT to the graphic of the printed ceramic support PC_i in terms of colour rendering.

In other words, starting from the two alignable images at the same resolution, the invention comprises appropriately processing the original graphic, to perform the colour conversion and make it as similar as possible to that of the acquired ceramic support.

The conversion step f4.4 envisages calculating the transformation values V1$i$→V2$i$ between an original colour space SCO of the original image IM_F_PRINT and a sample colour space SCC of the sample image IM_PCS_j, superposed and at the same resolution.

The transformation values V1$i$→V2$i$ define the possible transformations between elements of the original colour space SCO of the original image IM_F_PRINT and the sample colour space SCC of the sample image IM_PCS_j.

In a preferred embodiment of the invention, the transformation values V1$i$→V2$i$ are values of one or more RGB triplets.

The first processing station 10 comprises a first calculating module 106 configured to perform the described step.

In other words, the first processing station 10 is configured for calculating the transformation values V1$i$→V2$i$ between an original colour space SCO of the original image IM_F_PRINT and a sample colour space SCC of the sample image IM_PCS_j, superposed and at the same resolution.

As shown in FIG. 6A, 6B, according to the invention, to calculate the transformation values V1$i$→V2$i$ the invention comprises (f4.4.1) identifying a first sliding window SW_1 (FIG. 6A) in the original image IM_F_PRINT and a second sliding window SW_2 in the sample image IM_PCS_j in which the windows SW_1, SW_2 slide in the respective images in a like way.

In other words, the invention envisages identifying two windows of settable dimensions (e.g. from 1×1 to 11×11) that slide, respectively, one on the region of interest ROI of the original image IM_F_PRINT, and the other on the acquired sample image IM_PCS_J.

The first calculating module 106 of the first processing station 10 comprises a first identifying module 106*a* (FIG. 3) configured to perform the described step f4.4.1.

In other words, the first processing station 10 is configured for identifying a first sliding window SW_1 in the original image IM_F_PRINT and a second sliding window SW_2 (FIG. 6B) in the sample image IM_PCS_j in which the windows SW_1, SW_2 slide in the respective images in a like way.

The invention comprises, subsequently, the step (f4.4.2) of calculating sample representative values V2$i$ of a sample colour space SCC of the sample image IM_PCS_j and original representative values V1$i$ of an original colour space SCO of the original image IM_F_PRINT, respectively in each of the two sliding windows identified.

In particular, the invention comprises calculating, both for the sliding window SW_1 which slides on the region of interest ROI, and for the like sliding window SW_2 that slides on the sample image one or more transformation values V1$i$→V2$i$ expressed through RGB triplets.

According to the invention, the sliding windows SW_1, SW_2 are the same respective positions with respect to the respective images when the transformation values V1$i$→V2$i$ are calculated, preferably expressed as values of RGB triplets.

The first calculating module 106 of the first processing station 10 comprises a second calculating module 106*b* (FIG. 2B) configured to perform the described step f4.4.2.

In other words, the first processing station 10 is configured for calculating sample representative values V2$i$ of a sample colour space SCC of said sample image IM_PCS_j and original representative values V1$i$ of an original colour space SCO of the original image IM_F_PRINT, respectively in each of the two sliding windows identified.

The invention comprises, at this point, the step (f4.4.3) of mapping the sample representative values V2$i$ and the original representative values V1$i$ allowing a transformation from the original value of colour rendering RC_1 to the value of colour rendering RC_2 of the sample.

In other words, the invention comprises creating a transformation function between each component of the colour rendering RC_1 of the original graphic and multiple possible values obtained from the acquired image; this is acceptable as, for example, multiple values in the acquired image can correspond to the same mean value of the sliding window SW_1 on the ROI.

The first calculating module 106 of the first processing station 10 comprises a mapping module 106*c* (FIG. 3) configured to perform the described step f4.4.3.

The invention further comprises the step f4.4.4 of identifying a colour transformation TR_OK between the sample representative values V2$i$ and the original representative values V1$i$ which is representative of complete mapping M_OK between said sample colour space SCC and the original colour space SCO.

The first calculating module 106 of the first processing station 10 comprises a second identifying module 106*d* (FIG. 3) configured to perform the described step f.4.4.4.

In other words, the first processing station 10 is configured for identifying the colour transformation TR_OK between the original representative values V1*i* and the sample representative values V2*i* which is representative of a complete mapping M_OK between the original colour space SCO and the sample colour space SCC.

It is possible that at the end of step f.4.4.4 a RGB triplet of the original colour space SCO is associated with multiple RGB triplets of the sample colour space SCC. Therefore, a generalised transformation is calculated that approximates in the best possible way this multiple mapping.

According to the invention, to obtain complete mapping M_OK, three different solutions are implemented starting from techniques known in literature:

Linear Regression RL: a matrix of coefficients K(1 . . . n) is calculated which is the solution of a system of linear equations formed by the SCO/SCC samples obtained in the preceding mapping step f.4.4.3 from mapping sample representative values V2*i* to the original representative values V1*i*.

In particular, as already said, the sample representative values V1*i*, V2*i* are values of one or more RGB triplets.

To calculate a prediction of the transformation value of an RGB triplet of the original colour space SCO, this is multiplied by the matrix of coefficients K.

The second identifying module 106*d* comprises a first transformation sub-module 106*d*1 configured to identify the colour transformation TR_OK by means of the linear regression technique RL described.

In other words, the first processing station 10 is configured to identify the colour transformation TR_OK by means of the linear regression technique described. Artificial Neural Networks ANN: The matches between the original colour space SCO and the sample colour space SCC obtained in the preceding mapping step f.4.4.3 from the sample representative values V2*i* and the original representative values V1*i* are used for training an artificial neural network.

To obtain the prediction of the transformation of an RGB triplet of the original colour space SCO into an RGB triplet of the sample colour space SCC the RGB triplet of the original colour space SCO is subjected to transformations by the neural network.

Based on the structure of the network, the triplet undergoes one or more transformations resulting from the network training step and finally the result of the transformation is obtained.

Unlike linear regression the function is not necessarily linear, therefore it allows the transformation from original colour space SCO to sample colour space scc to be described better.

The second identifying module 106*d* comprises a second transformation sub-module 106*d*2 configured to identify the colour transformation TR_OK by means of the artificial neural network technique described.

In other words, the first processing station 10 is configured to identify the colour transformation TR_OK by means of the artificial neural network technique ANN described.

Look Up Table LUT: each RGB triplet of the original colour space SCO is associated with one from among mean, mode, median of the RGB samples mapped by the sample colour space SCC, obtained in the preceding step f.4.4.3 of mapping from said sample representative values V2*i* to said original representative values V1*i*.

This leads to one-to-one mapping between triplets of the original colour space SCO and triplets of the sample colour space SCC.

To obtain a prediction of the transformation value of an RGB triplet of the original colour space, the LUT in the position identified by the RGB triplet of the original colour space SCO is accessed.

The second identifying module 106*d* comprises a third transformation sub-module 106*d*3 configured to identify the colour transformation TR_OK by means of the Look Up Table LUT technique described.

In other words, the first processing station 10 is configured to identify the colour transformation TR_OK by means of the Look Up Table LUT technique described. Unlike the two previous solutions that determine a mathematical function for predicting the transformation of each RGB triplet, the LUT may not completely map the triplets of the original colour space SCO.

If this happens:
  the invention comprises acquiring further images of real tiles for mapping the original colour space SCO not yet mapped.
  the invention comprises estimating the missing triplets using the 1:1 matches of the LUT as parameters for the linear regression system or alternatively for training an artificial neural network.

In other words, according to the invention, therefore, to obtain complete mapping M_OK the following steps are comprised:
  verifying the mapping of the Look Up Table LUT;
  if the Look Up Table LUT does not completely map the RGB triplets of the original colour space SCO;
    acquiring further sample images IM_PCS_J for mapping a part of the original colour space SCO not yet mapped;
    estimating the missing RGB triplets using the 1:1 matches of the LUT as parameters for the linear regression system RL or alternatively for training an artificial neural network ANN.

Once the transformation function has been obtained, the LUT is populated in the positions identified by the missing RGB triplets of the original colour space SCO with the linear regression or artificial neural network predictions.

The second identification module 106*d* is (FIG. 3) configured to perform the described step of obtaining complete mapping M_OK.

In other words, the first processing station 10 is configured to check whether the LUT does not completely map the triplets of the original colour space SCO, acquire further sample images of real tiles for mapping a part of the original colour space SCO not yet mapped, and to estimate the missing triplets using the 1:1 matches of the LUT as parameters for the linear regression system or alternatively for training an artificial neural network.

With reference to FIG. 2, the step f5 comprises modifying the original image file F_PRINT as a function of the colour transformation TR_OK previously calculated, an adapted image file F_ADAPT The technical effect achieved is a graphic adaptation of the original image file F_PRINT to the graphic of the sample image IM_PCS_j of the acquired ceramic support PC_i in terms of colour rendering.

The invention provides the main technical effect of an optimal graphic/colour match between the appropriately processed original graphic file and the image acquired by means of the acquisition system, of the printed ceramic support.

The invention, as described, further has some technical effects; the two images, having very slight differences in colorimetric terms, but only attributable to the production process, can be used to evaluate the correctness of the graphic/decoration, i.e. in other words, to check the quality of the ceramic supports produced.

Appropriate image processing algorithms, having two very similar images to each other, can extract the differences between them, classify them based on size, shape, type, etc. determining an acceptability classification or not.

In an automatic inspection system, such procedure drastically reduces the time of the setup step and guarantees greater reliability in the extraction of possible production defects, reducing false recognitions thereof.

In fact, to reach these technical effects, the invention comprises a quality control method for ceramic supports PC_i.

The method comprises the steps of:
generating a suitable image file F_ADAPT starting from an original image file F_PRINT, as previously described;
receiving a printed ceramic support PC_i;
identifying a portion P_F_ADAPT in the adapted image file F_ADAPT, obtained as previously described, corresponding to the graphic reproduced on the printed ceramic support PC_i;
detecting graphic differences Dd between the graphic reproduced on the printed ceramic support PC_i and the portion P_F_ADAPT of the adapted image file F_ADAPT;
classifying into classes Ci the printed ceramic support PC_i as a function of the detected differences Dd, thus realising a quality control of the printed ceramic supports PC_i.

To actuate the method, the invention comprises (FIG. 1A) a quality control system 200 for ceramic supports PC_i comprising:
the graphic adaptation system 100, previously described, configured to generate an adapted image file F_ADAPT starting from the original image file F_PRINT; receiving means 400 of a printed ceramic support PC_i;
a classification system 300, coupled to the graphic adaptation system 100 and to the receiving means 400 of a printed ceramic support PC_i, comprising a second processing station 110 (FIG. 1A).

For the second processing station 110 the same structural/functional/module considerations expressed in relation to the first processing station 10, on pages 6 and 7 are valid.

The second processing station 110 comprises:
a research module 111 configured to identify a portion P_F_ADAPT in the adapted image file F_ADAPT, corresponding to the graphic reproduced on said printed ceramic support PC_i;
a detecting module 112 configured to identify graphic differences (Dd) between the graphic reproduced on the printed ceramic support PC_i and the portion P_F_ADAPT of the adapted image file F_ADAPT;
a classification module 113 configured to classify into classes Ci the printed ceramic support PC_i as a function of the detected differences Dd, thus realising a quality control of the printed ceramic supports PC_i.

For example, the classification module 113 classifies the tiles into a plurality of classes among which one class C1 is representative of first choice tiles, one class C2 is representative of second choice tiles and one class C3 is representative of third choice tiles.

The detected differences Dd that determine the classification are global differences in terms of colour and local defects such as missing decorations, presence of drops of colour, presence of lines of colour, missing graphic parts, impurities, evaluated based on shape, position, size, intensity, etc.

Preferably the graphic adaptation system 100 and the classification system 300 are provided on a same machine; in other words, the quality control system 200 is monolithic.

Alternatively, the graphic adaptation system 100 and the classification system 300 are provided on different machines; in other words, the quality control system 200 is distributed.

In this second case, the image acquisition devices of the two systems are calibrated between each other in the colour space so as to be able to indistinctly use the adapted image file F_ADAPT.

Furthermore, this technique, mainly devised for the quality control of ceramic supports decorated with random printing techniques, can also be used in the case of fixed face printing, avoiding printing all the necessary samples for comparison, allowing them to be constructed digitally starting from the original graphics of each face.

In a further aspect, the invention comprises a production system for producing ceramic supports comprising a quality control system for ceramic supports PC_i, interposed between an image printing system on ceramic supports PC_i and a kiln for firing the ceramic supports themselves.

In particular, the quality control system is the system 100 described above.

The invention claimed is:

1. A graphic adaptation method for sample ceramic supports adapted to receive a print, the method comprising the steps of:
loading an original image file representing an image for printing comprising a graphics to be printed on a plurality of ceramic supports, said original image file being graphically defined by first identifying graphic characteristics comprising one or more of: an original value of color rendering, a resolution or a first reference perspective;
printing a plurality of images on said sample ceramic supports starting from said original image file;
acquiring, through an image acquisition device, a sample image of said plurality of images printed on said sample ceramic supports, said sample image being graphically defined by second identifying graphic characteristics depending on said image acquisition device, said second identifying graphic characteristics comprising one or more of: a sample value of color rendering, a sample resolution or a second reference perspective;
selecting sample points representative of said sample image, and selecting original points present in the original image file;
seeking a point-based matching between said sample points representative of said sample image, and said original points present in said original image file;
modifying said original image file starting from said point-based matching by determining an adapted image file, thus adapting the graphics of the original image file to the graphics of the sample image; and
extracting at least one original image in said original image file that corresponds to said sample image as a function of said point-based matching sought.

2. The graphic adaptation method of claim 1, wherein said point-based matching comprises seeking a biunivocal match between said sample points representative of the sample image and said original points present in the original image file.

3. The graphic adaptation method of claim 1, wherein said point-based matching comprises seeking a spatial and color point-based matching between the sample points representative of the sample image and original points present in the original image file.

4. The graphic adaptation method of claim 1, further comprising the step of:
graphically aligning said sample image and said at least one original image as a function of respective resolutions and/or respective perspectives.

5. The graphic adaptation method of claim 4, further comprising the step of:
calculating, with reference to said sample image and said at least one original image when aligned and at a same resolution, transformation values between said sample value of color rendering and said original value of color rendering starting from said point-based matching between said sample points and said original points, thus adapting color rendering of the graphics of the original image file to color rendering of the graphics of the sample image.

6. The graphic adaptation method of claim 5, wherein said step of calculating transformation values comprises the steps of:
identifying a first sliding window in said original image and a second sliding window in said sample image, said sliding windows sliding in the respective images in an analogous manner;
calculating sample representative values of a sample color space of said sample image and original representative values of an original color space of said original image, in each of said second sliding window and said first sliding window respectively; and
performing a mapping from said sample representative values to said original representative values, thus enabling a transformation from said original value of color rendering to said sample value of color rendering.

7. The graphic adaptation method according to claim 6, wherein said step of calculating transformation values further comprises the step of:
identifying a color transformation between said sample representative values and said original representative values that is representative of a complete mapping between said sample color space and said original color space.

8. The graphic adaptation method according to claim 7, wherein said complete mapping is obtained by:
a linear regression, wherein a matrix of coefficients is calculated as a solution of a system of linear equations formed by samples obtained in the step of performing the mapping from said sample representative values to said original representative values; or
an artificial neural network, wherein matches between the original color space and the sample color space obtained in the step of performing the mapping from said sample representative values to said original representative values are adopted for training the artificial neural network.

9. The graphic adaptation method according to claim 8, wherein said sample representative values are values of one or more RGB triplets.

10. The graphic adaptation method according to claim 9, wherein said complete mapping is obtained by a lookup table in which each RGB triplet of the original color space is associated with a mean, mode, or median of the samples mapped by the sample color space, obtained in the step of performing the mapping from said sample representative values to said original representative values.

11. The graphic adaptation method according to claim 10, wherein said complete mapping further comprises the steps of:
verifying the mapping of the lookup table;
if the lookup table does not completely map the RGB triplets of the original color space then:
acquiring further sample images for mapping a part of the original color space not yet mapped; and
estimating missing RGB triplets using 1:1 matches of the lookup table as parameters for the linear regression or alternatively for training the artificial neural network.

12. The graphic adaptation method according to claim 7, wherein said step of modifying said original image file includes modifying the original image file as a function of said calculated color transformation, thus determining said adapted image file.

13. The graphic adaptation method according to claim 4, wherein said step of graphically aligning is provided through variation of said original resolution of said original image to the value of said sample resolution of said sample image.

14. A graphic adaptation method for sample ceramic supports adapted to receive a print, the method comprising the steps of:
loading an original image file representing an image for printing comprising a graphics to be printed on a plurality of ceramic supports, said original image file being graphically defined by first identifying graphic characteristics comprising one or more of: an original value of color rendering, a resolution or a first reference perspective;
printing a plurality of images on said sample ceramic supports starting from said original image file;
acquiring, through an image acquisition device, a sample image of said plurality of images printed on said sample ceramic supports, said sample image being graphically defined by second identifying graphic characteristics depending on said image acquisition device, said second identifying graphic characteristics comprising one or more of: a sample value of color rendering, a sample resolution or a second reference perspective;
selecting sample points representative of said sample image, and selecting original points present in the original image file;
seeking a point-based matching between said sample points representative of said sample image, and said original points present in said original image file; and
modifying said original image file starting from said point-based matching by determining an adapted image file, thus adapting the graphics of the original image file to the graphics of the sample image,
wherein said step of printing a plurality of images on said sample ceramic supports is provided in a printing mode selected from random mode and fixed faces mode.

15. The graphic adaptation method according to claim 14, wherein
said step of printing comprises printing, in said random mode, a limited plurality of images on said sample ceramic supports starting from said original image file; and said step of acquiring comprises randomly acquiring said sample image of said plurality images printed on said sample ceramic supports printed in random mode.

16. The graphic adaptation method according to claim 15, wherein said step of point-based matching by printing in random mode is provided for seeking a position in which the sample image is positioned in the original image file.

17. The graphic adaptation method according to claim 14, wherein
said step of printing comprises printing, in said fixed faces mode, a limited plurality of images on said sample ceramic supports starting from said original image file; and
said step of acquiring comprises acquiring said one sample image of said plurality of images printed on said sample ceramic supports printed in fixed faces mode.

18. A quality control method for ceramic supports comprising the steps of:
generating an adapted image file starting from an original image file;
receiving a printed ceramic support;
identifying a portion in said adapted image file corresponding to the graphics reproduced on said printed ceramic support;
detecting graphic differences between the graphics reproduced on said printed ceramic support and said portion of the adapted image file; and
classifying said printed ceramic support into classes as a function of said detected differences, thus providing a quality control of said printed ceramic supports,
wherein the generating step comprises:
loading an original image file representing an image for printing comprising a graphics to be printed on a plurality of ceramic supports, said original image file being graphically defined by first identifying graphic characteristics comprising one or more of: an original value of color rendering, a resolution or a first reference perspective;
printing a plurality of images on said sample ceramic supports starting from said original image file;
acquiring, through an image acquisition device, a sample image of said plurality of images printed on said sample ceramic supports, said sample image being graphically defined by second identifying graphic characteristics depending on said image acquisition device, said second identifying graphic characteristics comprising one or more of: a sample value of color rendering, a sample resolution or a second reference perspective;
selecting sample points representative of said sample image, and selecting original points present in the original image file;
seeking a point-based matching between said sample points representative of said sample image, and said original points present in said original image file; and
modifying said original image file starting from said point-based matching by determining an adapted image file, thus adapting the graphics of the original image file to the graphics of the sample image.

\* \* \* \* \*